US007662293B2

(12) United States Patent
Brolin et al.

(10) Patent No.: US 7,662,293 B2
(45) Date of Patent: Feb. 16, 2010

(54) METHOD AND APPARATUS FOR LIQUID PURIFICATION

(75) Inventors: Anders Brolin, Hagersten (SE); Kristoffer Nyberg, Stockholm (JP); Haidong Liao, Stockholm (SE)

(73) Assignee: BenRad AB, Stockholm (SE)

( * ) Notice: Subject to any disclaimer, the term of this patent is extended or adjusted under 35 U.S.C. 154(b) by 200 days.

(21) Appl. No.: 10/530,892

(22) PCT Filed: Oct. 8, 2003

(86) PCT No.: PCT/SE03/01564

§ 371 (c)(1),
(2), (4) Date: Oct. 20, 2005

(87) PCT Pub. No.: WO2004/033376

PCT Pub. Date: Apr. 22, 2004

(65) Prior Publication Data

US 2006/0108293 A1    May 25, 2006

(30) Foreign Application Priority Data

Oct. 9, 2002    (SE) .................................... 0202978
Jun. 3, 2003    (SE) .................................... 0301604

(51) Int. Cl.
*C02F 1/32*    (2006.01)

(52) U.S. Cl. ...................... 210/748; 210/739; 210/660; 210/695; 210/743; 210/754; 428/403; 428/402

(58) Field of Classification Search ................. 210/748, 210/638, 760, 739, 743, 758, 723, 695, 660, 210/201, 223; 428/403, 402; 204/158.21
See application file for complete search history.

(56) References Cited

U.S. PATENT DOCUMENTS

| 4,141,830 | A  |   | 2/1979  | Last |
| 4,156,652 | A  | * | 5/1979  | Wiest ....................... 422/186.3 |
| 4,230,571 | A  | * | 10/1980 | Dadd .......................... 210/760 |
| 4,273,660 | A  |   | 6/1981  | Beitzel |
| 4,863,608 | A  | * | 9/1989  | Kawai et al. ................. 210/638 |
| 5,843,309 | A  | * | 12/1998 | Mancil ........................ 210/205 |
| 5,935,431 | A  | * | 8/1999  | Korin .......................... 210/205 |
| 6,555,011 | B1 | * | 4/2003  | Tribelsky et al. ............. 210/748 |
| 2001/0050218 | A1 |   | 12/2001 | Tabatabaie-Raissi et al. |
| 2002/0043504 | A1 |   | 4/2002  | Chen et al. |

FOREIGN PATENT DOCUMENTS

| WO | WO 9501307 | 1/1995 |
| WO | WO 9620017 | 7/1996 |

* cited by examiner

*Primary Examiner*—Walter D Griffin
*Assistant Examiner*—Cameron J Allen
(74) *Attorney, Agent, or Firm*—Young & Thompson

(57) ABSTRACT

The present invention relates to a method for treating liquids, comprising the steps of irradiating a flow of air and a flow of the liquid to be treated at the same time in order to create ozone in both the air and the liquid, mixing the ozone-containing air with the liquid to be treated up-streams the liquid irradiating point, irradiating the flow of liquid containing the in-mixed ozone in order to break down the ozone in the liquid for producing free radicals.

20 Claims, 7 Drawing Sheets

METHOD AND APPARATUS FOR LIQUID PURIFICATION

BACKGROUND OF THE INVENTION

1. Field of the Invention

The present invention relates to a system for purifying liquid, and in particular water, by oxidizing contaminants in the liquid.

2. Description of the Related Art

There is an ever increasing need for purifying liquids, and in particular water. There are a number of applications where water needs to be purified and decontaminated, and a few of these are swimming pools and recreational baths, green houses, animal farms, cooling towers, hospitals etc. The conventional technologies for purifying and decontaminating water for most applications include the use of chemicals that are mixed with the water. Due to environmental aspects and the impact that chemicals have on the environment, humans and animals, there is a strive to reduce the use of chemicals.

One approach to purify/decontaminate water has been to use ozone. Several methods have been developed in several countries for purifying water with ozone ($O_3$) in drinking water installations and bathing facilities, and also ozone dissolved in water for cleaning, disinfection and sterilization of articles. A combination of ozone, oxygen, hydrogen peroxide and UV radiation means that the reaction proceeds much more quickly and more efficiently by virtue of the generation of more free radicals.

The inactivation of microorganisms with the aid of ozone and radicals is considered as an oxidation reaction. The membrane of the micro-organism is the first to be attacked. Within the membrane/cell wall, the ozone and the radicals destroy nuclear material inside the cell/virus/spore. The inactivation reaction in the case of most micro-organisms occurs within minutes, depending on the ozone dose and the amount of free radicals which are formed.

Despite its solubility in cold water, ozone is broken down (=consumed) quickly, as is the case in air, which gives a great many different radicals and more or less stable by-products such as aldehydes, bromate and carboxylic acids. The degree of breaking down depends on the pH, the substance which is exposed and the temperature. Certain substances are broken down easily by the ozone. However, the majority of substances and molecules are oxidized more efficiently by free radicals which are formed by ozone and the media treated by ozone.

One very efficient method of using free radicals in the oxidizing process is disclosed in the international patent application No. WO 96/20017. The method utilises UV-radiation to create ozone in air and liquid, radiates the ozone with certain wave-lengths in order to obtain free radicals, which oxidize the contaminants in the air or liquid. In order to increase the production of free radicals, catalysts are used, for example titanium oxides. The applicant of the above patent application has obtained very good results in purifying/decontaminating water in cooling towers, swimming pools, green houses, to name a few applications. The use of the patented method has enabled a complete removal of chemicals in those applications.

However, for certain applications, the device for purifying water or other liquids described in WO 96/20017 has capacity limitations as regards the amount to be treated per time period. Trials have been made to reduce the flow past the UV-radiation sources, to use the device also during periods when no consumption of water is taking place and to store the purified water in intermediate tanks. This has the drawback that additional space has to be available in order to accommodate the intermediate tanks. For some applications this might not be feasible and for some applications and large consumers it is not an optimal solution. There has also been a need from customers to be able to arrange the device so that minimal floor space is occupied.

Another application with specific problems is found in water systems in building. This is in connection with legionella bacteria, a water-based organism which causes infection when inhaled in an aerosol form, which is a huge problem all over the world, and is especially troublesome in hospitals, if already weak and sick people receive the bacteria via for example showers. If the tap-water is not hot enough the bacteria may thrive and multiply uncontrolled. The main solution to this problem has been to increase and to try to control the temperature of the water in order to prevent the occurrence of legionella bacteria. Chemicals that are able to kill these bacteria cannot usually be used for these applications since they may be harmful also to humans.

For certain applications, the above mentioned method has some shortcomings. If the liquid is heavily contaminated, the amount of ozone might not be sufficient to generate the amount of radicals needed for a complete removal of contaminants in the liquid. This may be due to that the radiating energy for creating ozone in the liquid either is absorbed or blocked by the contaminants or other particles/matter in the liquid. In for example treatment of salt water a lot of energy is absorbed by halogens. Thereby not enough ozone is created and thus not enough radicals for the purification process. There might also be the case that the amount of oxygen for creating ozone is insufficient.

In view of the above it would therefore be advantageous to increase the ozone content in a simple and economical way using the radicals as the primary purification oxidants. Regarding the application treating salt or brackish water it would be advantageous to use a continuous system.

There is thus a need for improvements in this technical area.

SUMMARY OF THE INVENTION

The invention aims at solving the above mentioned problems with a system according to the characterising part of claim 1 and 5. Preferable embodiments of the invention are covered by the dependent claims.

According to a main aspect of the invention it is characterised by a method for treating liquids, comprising the steps of irradiating a flow of air and a flow of the liquid to be treated at the same time in order to create ozone in both the air and the liquid, mixing the ozone-containing air with the liquid to be treated up-streams the liquid irradiating point, irradiating the flow of liquid containing the in-mixed ozone in order to break down the ozone in the liquid for producing free radicals.

According to another aspect of the invention it is characterised in exposing the fluid to at least one catalyst at the same time as the ozone is broken down for increasing the amount of free radicals.

According to a further aspect of the invention, it is characterised in that the mixing is obtained by an ejector effect into the flow of liquid.

The advantages with the present invention are several. By irradiating air and liquid at the same time with the same UV radiating light source ozone is created both in the air and in the liquid, thereby avoiding separate ozone generating sources. The ozone containing air is then fed to the flow of liquid up-streams the irradiating point, whereby among other constituents the ozone is mixed with the liquid to be treated.

In this way the ozone in the liquid starts to react with the contaminants to a certain extent. The ozone-containing liquid is then irradiated whereby the ozone created in the liquid and the ozone mixed with the liquid is broken down to form a large amount of free radicals, which perform the main purifying/treating action. In total larger quantities of ozone can be generated/contained in the liquid than if the liquid was only irradiated by the UV light generating means. This is especially true if one compares the oxygen content between for example water and air in that air contains drastically larger quantities of oxygen than water. Yet the increase of ozone is performed in a simple and effective way without using additional ozone generating means or pre-treatment containers. Because ozone is added, the previous mentioned problem with radiation energy being absorbed/blocked leading to insufficient production of ozone is thereby eliminated. The generating process is simultaneous in that ozone is created by the UV light generating means in both the air surrounding the UV light generating means and in the liquid in the container at the same time as the ozone in the container is broken down to produce radicals.

In order to further increase the amount of radicals, the treatment point, for example a container where the liquid is irradiated, is arranged with catalysts capable of increasing the amount of radicals. The catalysts can consist of titanium dioxide and may be arranged on the inner surface of the container. According to one embodiment the container might be manufactured from titanium, or at least lined with titanium, which is treated in a suitable way to create titanium dioxide. A very large catalytic surface is thus created in a simple and efficient way. Furthermore, the titanium has the advantage to withstand the very corrosive environment inside the container.

The mixing is preferably performed by using a throttle or the like decrease of the inlet section, like for example a Venturi pipe, which is capable of creating a negative pressure, thus creating an ejector effect. No special arrangements or components are thus required for mixing the ozone with the liquid. The amount of the ozone to be mixed can readily be regulated by controlling the air flow passing the UV-light generating means.

According to a further aspect of the invention it is directed to a system for treating liquids, and in particular water, including through-flowing means provided with inlets and outlets for the liquid, UV-light generating means arranged in the through-flowing means, capable of generating ozone in the through-flowing liquid and at the same time break down the ozone in order to produce free radicals, characterised in that mountable and demountable connection means are arranged to the inlet and outlet of the through-flowing means.

According to yet another aspect of the invention the system is characterised in that it is arranged with at least two through-flowing means and that preferably that each through-flowing means is designed as an elongated pipe.

According to yet an aspect of the invention, the UV-light generating means is arranged in one end of the elongated pipe and that ceramics is arranged on the inside of the through-flowing means at least adjacent said UV-generating means.

According to a preferred embodiment of the invention at least two of the said through flowing means are arranged in series, whereby the first through-flowing means is connected to an inlet pipe for liquid to be treated and that the last through-flowing means is connected to an outlet pipe for the treated liquid and/or are connected in parallel to an inlet pipe for liquid to be treated and an outlet pipe for the treated liquid.

According to a further aspect of the invention the through-flowing means is arranged adjacent a water outlet for human use like for example a shower head.

The advantages with the present invention are several. By arranging the through-flowing means with mountable and dismountable means it is very easy and convenient to vary the through-put through the system depending on the capacity requirements. One or several through-flowing means with UV-radiating lamps can be placed after each other, ie. in series, either directly or via bends, which enables the system to be adapted to the space available without for example taking up too much floor space. For a substantial increase of the system one or more through-flowing means may be arranged in parallel with a first inlet/outlet connected to an inlet pipe and the second inlet/outlet connected to an outlet pipe.

By using the components of the system in series and/or in parallel the through-put may be varied almost infinitely. Several parallel arrangements of the system may be arranged in series in order to treat heavily contaminated water several times. The system is also based on standard components and fittings and reduces the need of special components in that standard lengths of through-flowing means with lamps can be combined with standard bends and connections to the water supply that is to be treated.

When placing a through-flowing means in connection to the outlet for a shower, one obtains the special advantage of taking care of the risk of being infected with legionella bacteria. Because of the pronounced risk of legionella in large tap water systems and the difficulties of exterminating them in such systems, the present invention removes the risk of any such bacteria leaving the water system. This is a clear advantage over the present solutions thereby completely eliminating the problem without any chemicals and without any risk for the users of water in these systems.

These and other aspects of, and advantages with, the present invention will become apparent from the following detailed description of the invention and from the accompanying drawings.

BRIEF DESCRIPTION OF THE DRAWINGS

In the follow detailed description of the invention reference will be made to the drawings, of which

DETAILED DESCRIPTION OF THE INVENTION

Figure 1:
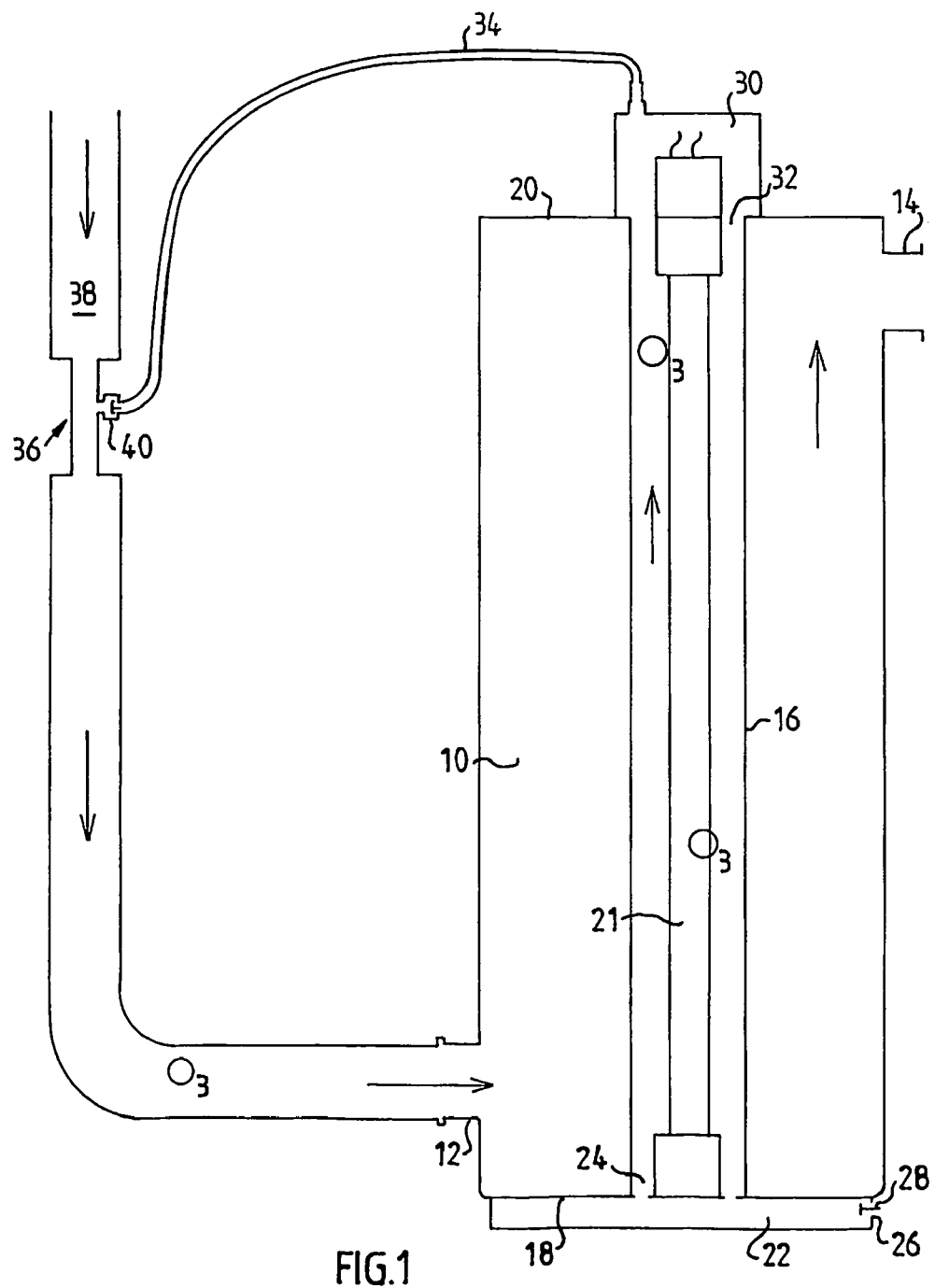
FIG. 1 is a schematic side view of a first embodiment of the present invention.

FIG. 1 shows one embodiment of the present invention. It comprises a treatment container 10 having an inlet 12 and an outlet 14 connectable to a transport system for the liquid to be treated. Substantially the whole inner surface is arranged with titanium, either in that the compartment is made of titanium or that the inner surface is arranged with a layer of titanium, which is treated to obtain titanium dioxide for increasing the amount of free radicals produced by the UV radiation.

The treatment to obtain titanium dioxide may for example be done by etching the titanium pipe or the layer. The titanium also has the advantage that it is very resistant to the corrosive environment inside the container.

A tube 16 made of quartz glass extends through the interior of the container between two opposite walls 18, 20. Inside the quartz tube a UV radiating light source 21 is arranged, which extends between the opposite walls of the compartment. The light source is connected to a suitable power supply.

At one end of the quartz tube a compartment 22 is arranged, having passages 24 communicating with the interior of the quartz tube. The compartment also is provided with an air intake passage 26, which passage is arranged with a one-way valve 28 admitting only air onto the compartment. Around the opposite end of the quartz tube a second compartment 30 is arranged. It also is arranged with passages 32 communicating with the interior of the quartz tube.

A conduit 34 is connected to the second compartment. The other end of the conduit is connected to a section 36 of the inflow conduit 38 via a one-way valve 40, which section 36 is arranged with a narrower cross-section like a Venturi tube in order to create a ejector effect around the connection of the conduit, as will be described below.

The device is intended to function as follows. The UV radiating light source is switched on, whereby it is chosen such that it emits wave lengths in the region of 180-400 nm, and in particular wavelength of 183.7 nm for converting oxygen in the medium to ozone molecules ($O_3$) and 254 nm for decomposing the ozone molecules, as will be described.

Air enters the quartz tube through the one-way valve in the first compartment and surrounds the UV generating light source. The irradiation causes the oxygen molecules to be converted to ozone. Since the air flows along almost the entire length of the UV generating light source it is exposed to radiation for a rather long period, ascertaining that a large quantity of ozone is created. At the same time some of the ozone is broken down to free radicals by the radiation wave lengths that decompose the ozone to radicals.

The liquid to be treated is fed through the liquid inlet 12 and into the container 10 surrounding the quartz tube 16. Because of the flow through the throttle section 36 of the flow conduit 38 of a Venturi-type, a negative pressure is created, whereby ozone from inside the quartz tube is drawn into the flow of liquid via the conduit 34 and the one-way valve 40. The liquid that thus enters the container is mixed with ozone.

Further, the irradiation of the liquid in the container will also create ozone by the UV light. Thus the liquid in the container contains both ozone that has been mixed in and ozone that has been created in the container by the irradiation. In the container the liquid is irradiated by the 254 nm wave length which causes the ozone in the liquid to decompose and hydroxyl radicals to be formed. It is a simultaneous generating process in that the UV light generating means generates ozone in the air and in the liquid at the same time as it generates radicals in the liquid. The amount of radicals is further increased by the catalytic properties of the inner wall of the container by the titanium dioxide.

By choosing the proper flow of air through the system the amount of ozone that is mixed with the liquid at the inflow can be regulated in correspondence with the capacity of the UV radiating light source so as to minimize the amount of residual ozone, thereby preventing that ozone leaves the container via the outlet.

Figure 2:
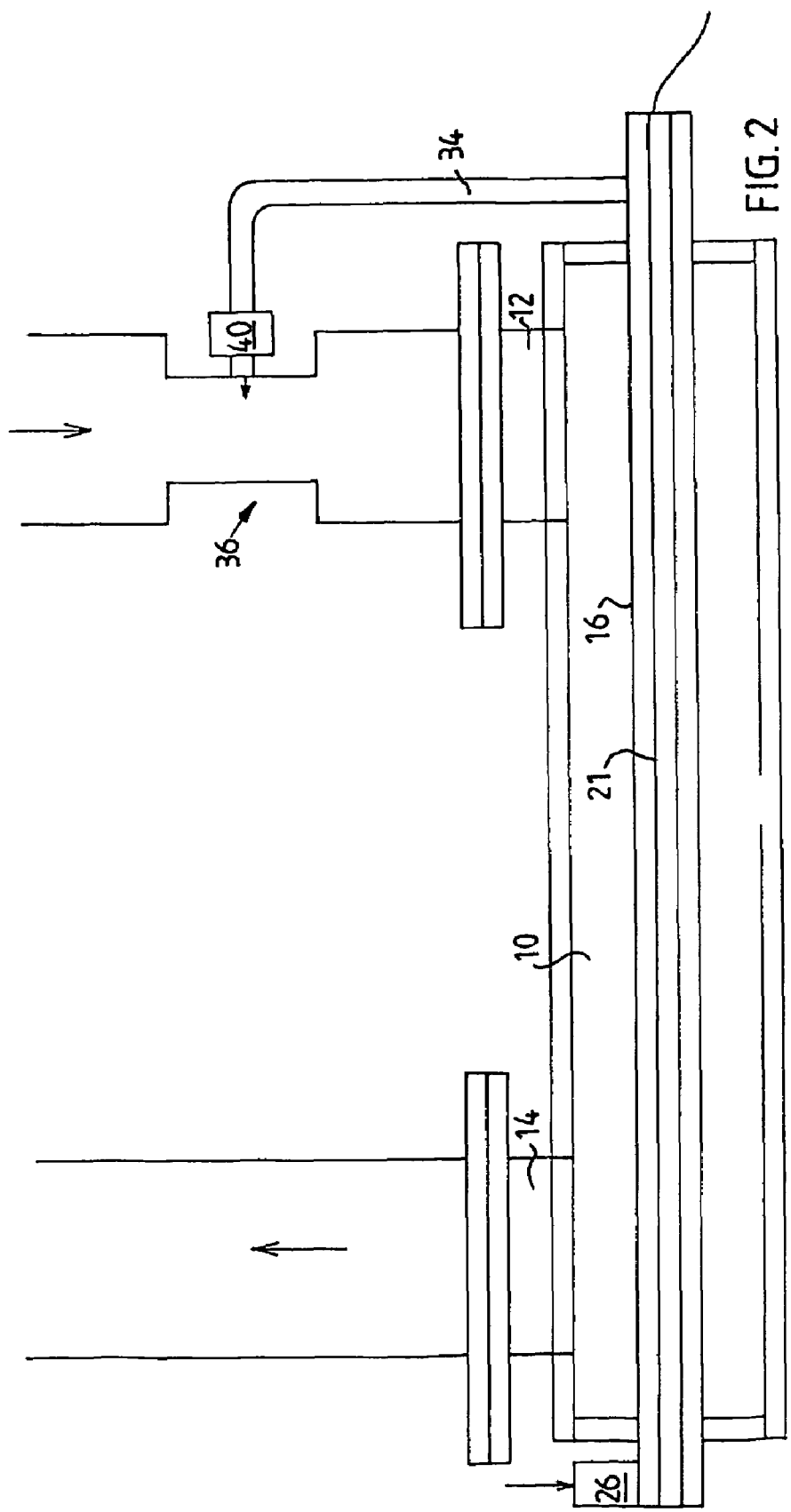
FIG. 2 is a schematic side view of a variant of the embodiment of FIG. 1.

FIG. 2 shows a variant of the device of FIG. 1 intended to be used with the modular system described in the Swedish patent application No. 0202987-3, which hereby is incorporated by reference. In this application one section of the device according to FIG. 2 can then replace two inter-connected sections according to 0202987-3. The device according to FIG. 2 can otherwise be connected in many different ways and connected with other parts, both in series and in parallel.

The invention according to the second aspect of the invention shown in FIGS. 3-7 utilises UV lamps emitting light within specific spectra. The liquid to be treated is exposed to UV radiation with a spectral distribution within the range of 180-400 nm. The wavelength of 183.7 nm in particular converts the oxygen in the medium to ozone molecules ($O_3$). The ozone molecules formed are at the same time decomposed by radiation within the abovementioned wavelength range, especially at a wavelength of 254 nm. At the same time, the $O_3$ formed is broken down to form atomic oxygen. In order to increase the efficiency during generation of free radicals, in particular OH— radicals, oxides are added as catalysts.

The present invention utilises the principle of using free radicals for purifying liquid, and in particular water. The system consists of at least one substantially straight pipe, 110, FIG. 3. The pipe is made of preferably titanium or some other material lined with titanium on the inside. The titanium on the inside of the pipe is treated to obtain a ceramic titanium oxide. The titanium oxide acts as a catalyst during the forming of free radicals, ie. the titanium oxide increases the amount of free radicals produced per time period. In one variant, a plastic pipe has been used, lined with titanium oxide. It is of course possible to utilize other highly resistant materials and to use catalysts as described in WO 96/20017 but experience has shown that the use of titanium pipes or pipes lined with titanium have provided excellent resistance against the very corrosive environment that the purification/decontamination results in.

Figure 3:
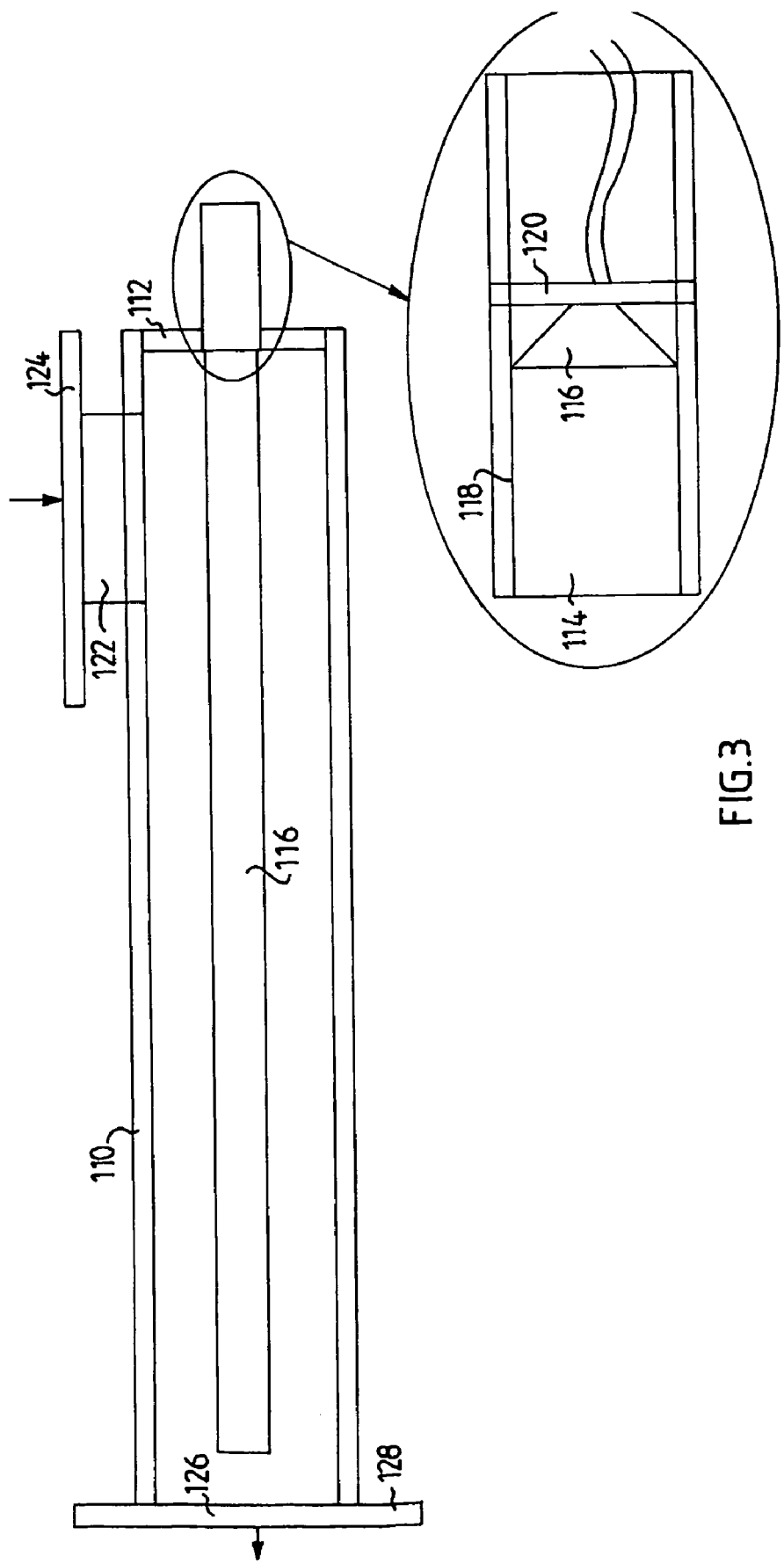
FIG. 3 shows a central component, a through-flowing means, for treating contaminated liquid, comprised in a second aspect of the present invention.

In the embodiment shown in FIG. 3 one end of the pipe is provided with an end wall 112. A passage 114 is arranged in the end wall and an UV radiating light source 116 is arranged in the passage with a surrounding housing 18 extending into the passage 114, providing UV radiation with wave lengths of 185 and 254 nm. These wave lengths have excellent properties in generating ozone in the water and then at the same time breaking down the ozone to free radicals. The housing is preferably provided with light emitting wall part 120 for the convenience of the user in displaying if the lamp is working or not. Previously a watching hole was arranged in the pipe, which was prone to be blocked by sediment and also to leakage. A drive unit for the UV lamps is also provided, not shown. A control unit for controlling one or several of the drive units is also provided, not shown. The design and function of the drive units and the control unit is mere routine work for the man skilled in the art and will not be described in more detail.

A first inlet/outlet 122 is arranged on the pipe wall adjacent the end wall, which inlet is arranged with suitable flanges 124 or other suitable connection means for connection to other piping. The inside of the pipe is treated to obtain titanium oxide for increasing the amount of free radicals produced by the UV radiation. The treatment to obtain titanium oxide may for example be done by etching the titanium pipe or the layer. The end of the pipe opposite the UV lamp is arranged as the second inlet/outlet 126, provided with suitable flanges 128 or other connecting means for connection to other piping.

Figure 4:
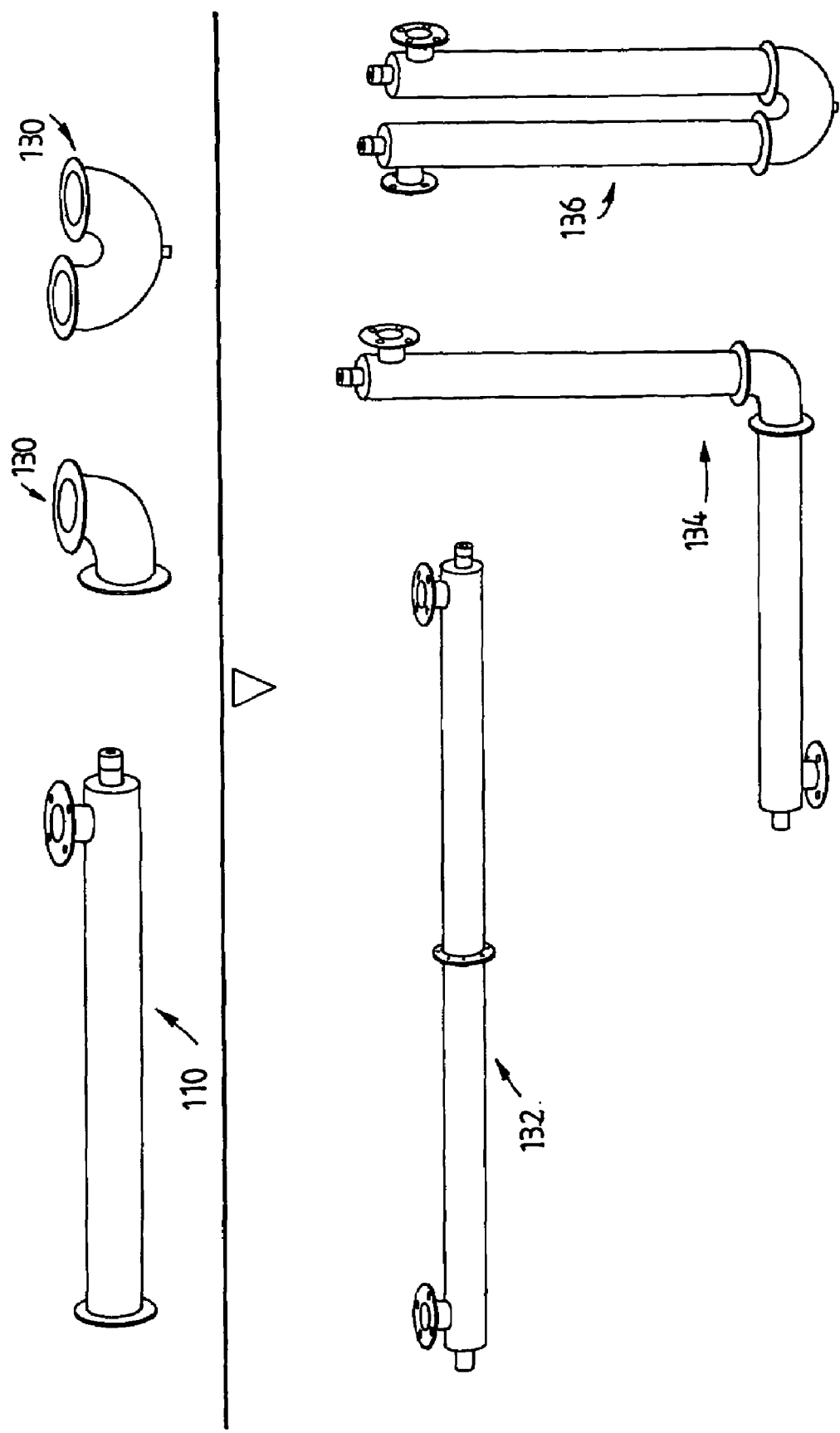
FIG. 4 shows different components that may be included in the invention according to FIG. 3.

As shown in FIG. 4 the system comprises pipe bends 130, for example 90° or 180° but of course other angles are possible. Also these parts, even though not provided with any UV-radiation means, are preferably made of titanium or lined with titanium. FIG. 4 also shows a few connection alternatives for combining the components of the system, like connecting two straight pipes by inter-connecting their second inlets/outlets either directly like in 132, via a 90° bend like in 134 or via a 180° bend like in 136.

Figure 5:
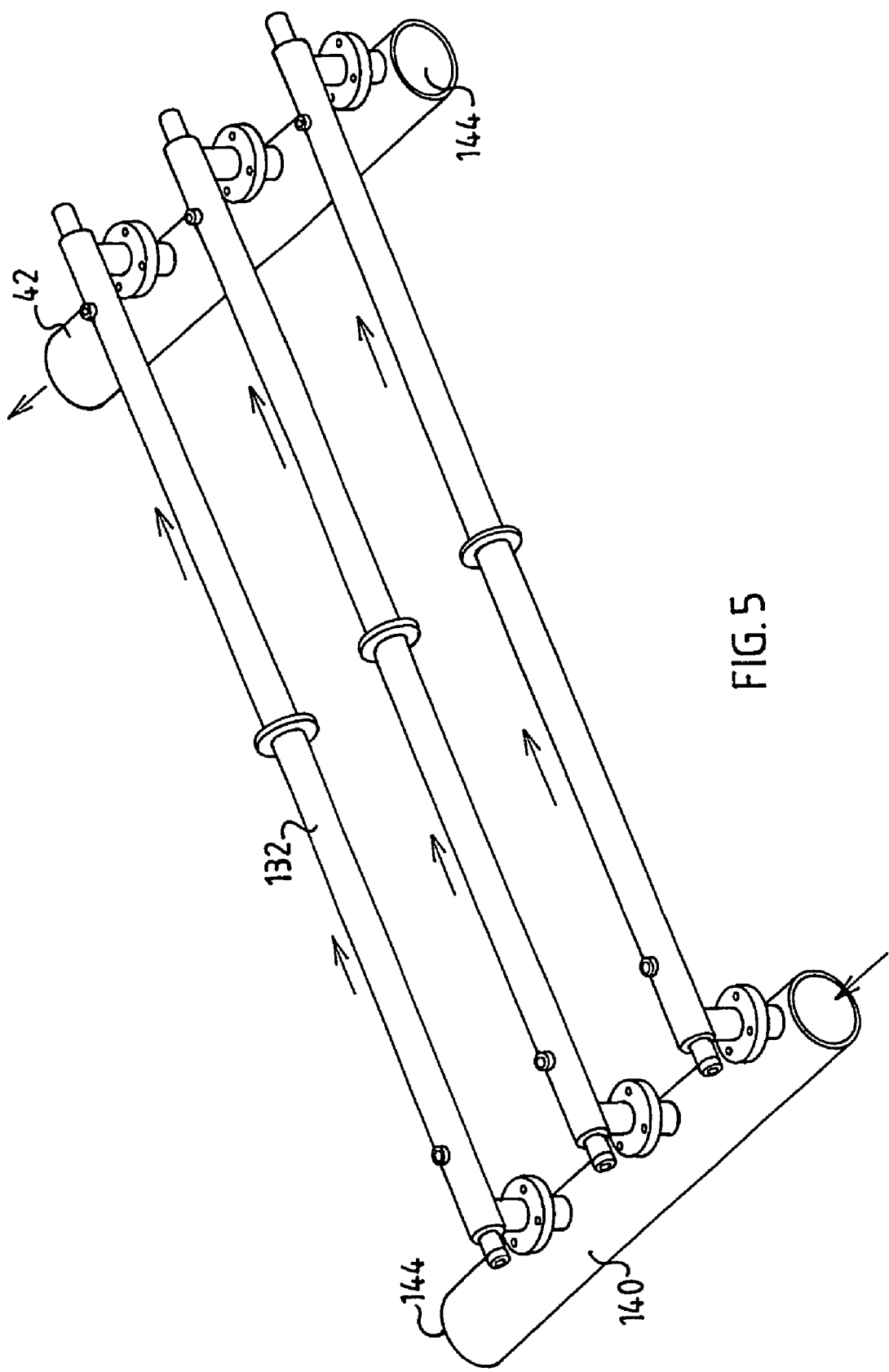
FIG. 5 shows one example of the use of the components of FIG. 3 to obtain the present invention.
Figure 6:
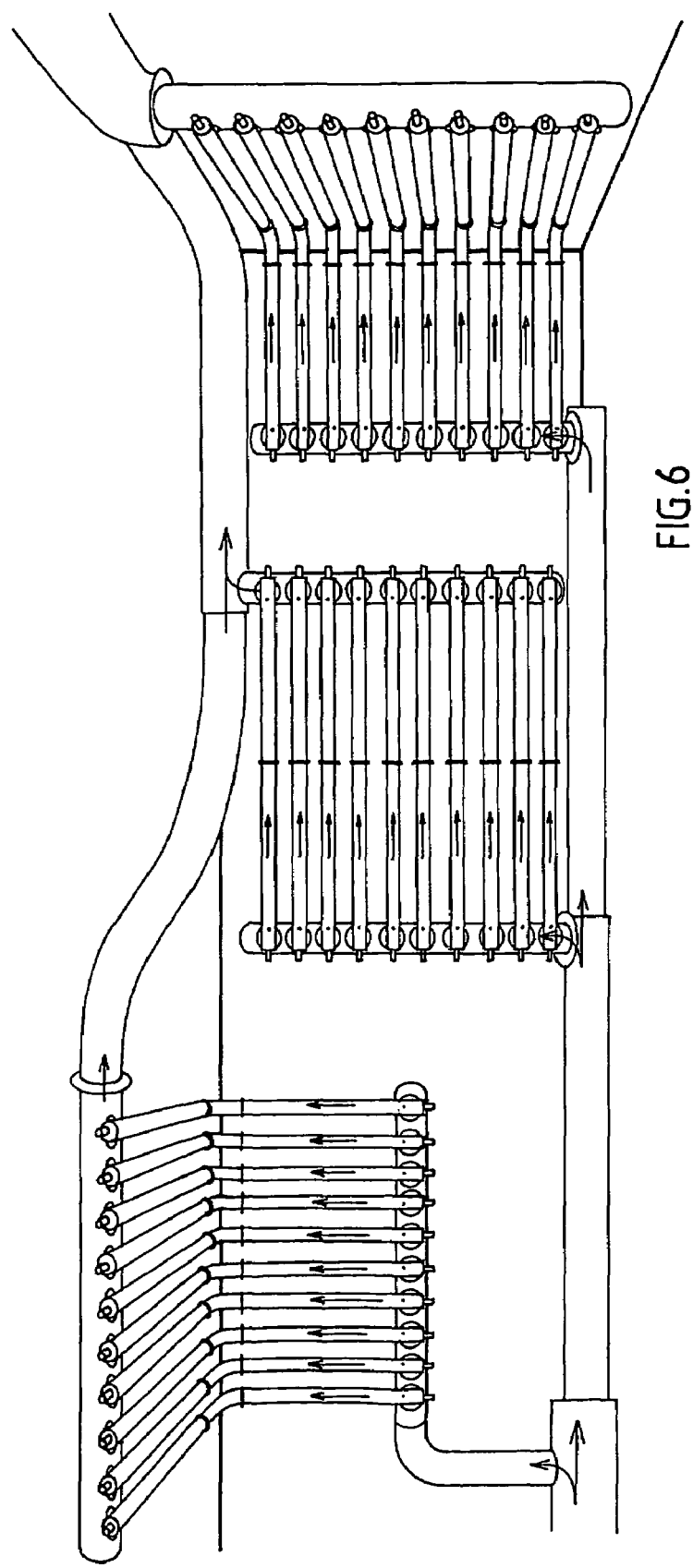
FIG. 6 shows another example of the use of the components.
Figure 7:
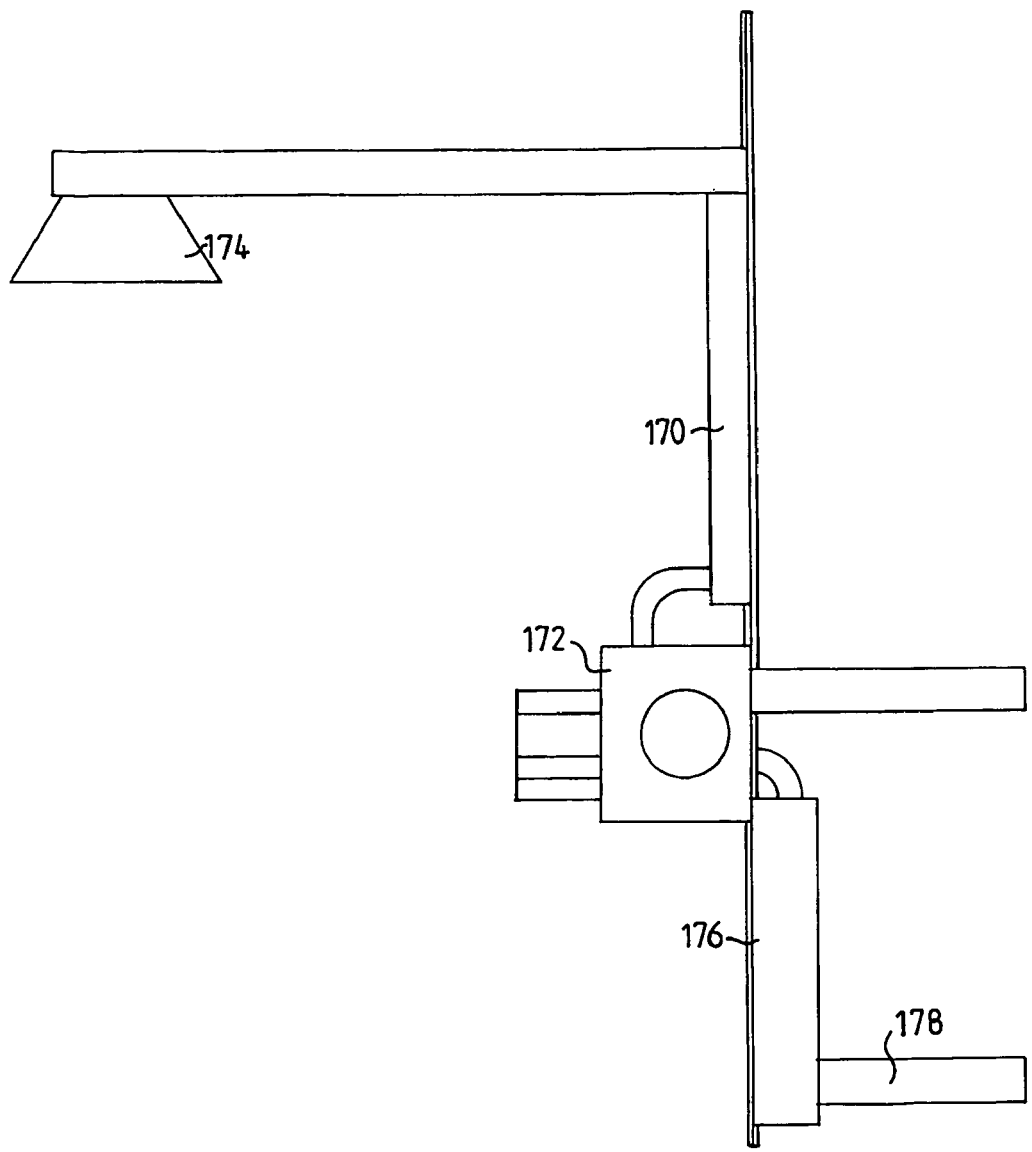
FIG. 7 shows the installation of a decontaminating unit in connection with a shower head.

FIGS. 5 and 6 show a "parallel-connected" system where two straight pipe sections 132, 134, 136 provided with UV lamps are inter-connected with their second inlets/outlets to each other, so in fact there is a "back-flow" in one of the pipes. Several of these inter-connected pipes are placed in parallel where the first inlets/outlets 122 of one of the inter-connected pipes are connected to a common inlet pipe 140 and where the first inlets/outlets of the other inter-connected pipes are connected to a common outlet pipe 142. In this case the water to be treated is fed via the inlet pipe 140, where the opposite end of the inlet pipe is closed by a wall 144, and in parallel through the inter-connected pipes 132 where the water is irradiated by the UV-lamps of both pipes. The water is then fed through the water outlet pipe 142. In the same manner the end of the outlet is closed by a wall 144.

The configuration enables both an increased capacity in that a large number of pipes including UV-radiating means can be connected depending on application and capacity requirements and also that walls and ceilings may be taken into use for setting up the system. In other words, very little floor space has to be utilized, which may be of importance for applications where space is limited. With the components it is further easy to adapt the system to existing layout of the space to be used, rather than to rebuild the space in order to fit the purifying system.

FIG. 6 shows another example where three parallel-connected units have been connected to main inlet and outlet pipes, where the units have been placed on the walls and ceilings and also around corners. The system is thus very versatile. It is to be understood that other designs of the components of the pipe system may be used without departing from the scope of the invention.

In this context it is also to be understood that lamps with different power may be used and that additional oxygen may be added by appropriate means in order to increase the amount of ozone and thus of free radicals. When the water is heavily contaminated, or when large amounts of free radicals in the water is needed, it is also conceivable to include an ultrasonic device placed in the vicinity of the UV-lamps. High amplitude ultrasonic waves generate free radicals and break contaminants.

One specific application where the system of the present invention may be utilized is for preventing legionella bacteria in connection with showers, which is a potential infection point because the bacteria may cause infection when inhaled in an aerosol form. In the embodiment shown in FIG. 7 a pipe 170 including an UV-amp as described above is connected to the outlet of a water faucet 172 in a shower or similar water outlet. The water from the faucet is led through the pipe where it is irradiated by the UV-lamp whereby ozone is created, and whereby at the same time the ozone is broken down into free radicals, which react with and destroys the legionella bacteria. The number of free radicals is increased by the titanium oxide on the inside of the pipe. In this context it is to be pointed out that the life span of the free radicals is extremely short and there is thus no risk whatsoever that free radicals can exit through the shower head 174. The inclusion of a disinfecting system according to the invention completely removes the risk of legionella bacteria to be spread to humans. It is also to be noted that in contrast to most devices using UV-light sources, where the light is switched off during non-use due to eg. energy consumption, the present device is switched on all the time in order to ensure that no legionella bacteria can pass the device and settle beyond the it. This is feasible due to the very low energy consumption needed for this particular application.

As an alternative, the pipe 176 may of course be connected to the inlet of the warm water 178 to the faucet 170, ie. before but in connection with, the faucet.

It is to be understood that the embodiments described above and shown in the drawings are to be regarded as non-limiting examples of the invention and that the scope of protection of the invention is defined by the patent claims.

The invention claimed is:

1. A method for treating liquids, comprising:
   irradiating a flow of air and a flow of liquid to be treated at a same time in order to create ozone in both the air and the liquid;
   mixing the ozone-containing air with the liquid to be treated upstream of a liquid irradiating point;
   irradiating the flow of liquid containing the in-mixed ozone in order to break down the ozone in the liquid for producing free radicals; and
   exposing the liquid to at least one catalyst at the same time as the ozone is broken down for increasing an amount of free radicals,
   wherein the method is performed in an apparatus comprising:
   a container having an inlet and an outlet for the liquid to be treated;
   a UV generating light source capable of irradiating an inside of the container;
   air guidance means arranged inside the container, connected to an air source and capable of guiding air past said UV generating light source for creating ozone; and
   a mixing means arranged to said inlet conduit capable of mixing the created ozone with the liquid to be treated and at least one catalyst arranged in said container and positioned to be irradiated by said UV generating light source, which catalyst is capable of breaking down the ozone for increasing the amount of free radicals,
   and wherein substantially a whole of an inner surface is arranged with the catalyst.

2. The method according to claim 1, wherein UV radiation which is emitted for breaking down the ozone and contaminants has a wavelength of 180 nm-400 nm.

3. The method according to claim 2, wherein the UV radiation which is emitted for breaking down the ozone has a wavelength of 254 nm.

4. The method according to claim 1, wherein the mixing is obtained by an ejector effect into the flow of liquid.

5. The method according to claim 1, wherein said air guidance means comprises a compartment divided from the inside of the container by a quartz glass and that said UV generating light source is arranged in or adjacent said compartment.

6. The method according to claim 1, wherein the catalyst comprises titanium dioxide.

7. The method according to claim 1, wherein the mixing means comprises a throttle on the inlet, which throttle is capable of creating an ejector effect of the air/ozone into the flow of liquid.

8. The method according to claim 1 wherein the apparatus treats water and the apparatus further includes through-flowing means provided with inlets and outlets for the liquid, the UV generating light source being arranged in the through-flowing means, capable of generating ozone in the through-flowing liquid and at the same time break down the ozone in order to produce free radicals, wherein mountable and demountable connection means are arranged to the inlet and outlet of the through-flowing means.

9. The method according to claim 8, wherein the apparatus is arranged with at least two through-flowing means.

10. The method according to claim 9, wherein said through-flowing means are arranged in series, whereby a first through-flowing means is connected to an inlet pipe for liquid to be treated and that a second through-flowing means is connected to an outlet pipe for the treated liquid.

11. The method according to claim 9, wherein at least two of the said through flowing means are connected in parallel to an inlet pipe for liquid to be treated and an outlet pipe for the treated liquid.

12. The method according to claim 8, wherein the through-flowing means is an elongated pipe.

13. The method according to claim 12, wherein the UV generating light source is arranged in one end of the elongated pipe.

14. The method according to claim 8, wherein ceramics are arranged on the inside of the through-flowing means at least adjacent said UV generating light source.

15. The method according to claim 14, wherein the ceramics comprise titanium oxides.

16. The method according to claim 8, wherein the through-flowing means is arranged adjacent a water outlet for human use, or a shower head for human use.

17. The method according to claim 16, wherein the through-flowing means is arranged between a water faucet and the water outlet.

18. The method according to claim 16, wherein the through-flowing means is arranged between a warm water pipe and a faucet connected to the water outlet.

19. A method for treating liquids, comprising:
irradiating a flow of air and a flow of liquid to be treated at a same time in order to create ozone in both the air and the liquid;
mixing the ozone-containing air with the liquid to be treated upstream of a liquid irradiating point;
irradiating the flow of liquid containing the in-mixed ozone in order to break down the ozone in the liquid for producing free radicals; and
exposing the liquid to at least one catalyst at the same time as the ozone is broken down for increasing an amount of free radicals.

20. A method for treating liquids, comprising:
irradiating at a region of 180-400 nm including 183.7 nm a flow of air and a flow of liquid to be treated at a same time in order to create ozone in both the air and the liquid;
mixing the ozone-containing air with the liquid to be treated upstream of a liquid irradiating point;
irradiating at a region of 180-400 nm including 254 nm the flow of liquid containing the in-mixed ozone in order to break down the ozone in the liquid for producing free radicals; and
exposing the liquid to at least one catalyst at the same time as the ozone is broken down for increasing an amount of free radicals.

* * * * *